United States Patent
Nakashima et al.

(10) Patent No.: US 10,081,363 B2
(45) Date of Patent: Sep. 25, 2018

(54) CONTROL APPARATUS OF POWERTRAIN WITH CENTRIFUGAL PENDULUM ABSORBER

(71) Applicant: Mazda Motor Corporation, Aki-gun, Hiroshima (JP)

(72) Inventors: Kyosei Nakashima, Hiroshima (JP); Yasunari Nakayama, Kure (JP); Tadashi Saito, Hiroshima (JP); Masaru Nakagishi, Hiroshima (JP); Narifumi Domen, Aki-gun (JP); Narihito Hongawara, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/386,709

(22) Filed: Dec. 21, 2016

(65) Prior Publication Data

US 2017/0190332 A1 Jul. 6, 2017

(30) Foreign Application Priority Data

Jan. 6, 2016 (JP) .................................. 2016-001242

(51) Int. Cl.
*B60W 30/182* (2012.01)
*B60W 30/20* (2006.01)
(Continued)

(52) U.S. Cl.
CPC .......... *B60W 30/182* (2013.01); *B60W 10/02* (2013.01); *B60W 10/06* (2013.01);
(Continued)

(58) Field of Classification Search
CPC .... B60W 30/20; B60W 30/182; B60W 10/06; B60W 10/02; B60W 2710/06;
(Continued)

(56) References Cited

U.S. PATENT DOCUMENTS 9,791,043 B2 * 10/2017 Nakashima ......... F16F 15/1478
2013/0029804 A1 * 1/2013 Misala .................. F16D 27/004
477/5

(Continued)

FOREIGN PATENT DOCUMENTS

JP 2014228009 A 12/2014

*Primary Examiner* — Jacob S. Scott
*Assistant Examiner* — Tinh Dang
(74) *Attorney, Agent, or Firm* — Alleman Hall Creasman & Tuttle LLP

(57) ABSTRACT

A control apparatus of a powertrain with a centrifugal pendulum absorber, includes an engine formed with a plurality of cylinders, a drive force transmission shaft for receiving an engine output torque, a centrifugal pendulum absorber for reducing a variation in the output torque, a connect-disconnect mechanism, an engine controlling module for shifting an engine operating state between an all-cylinder operation and a reduced-cylinder operation, and a connection controlling module. The connection controlling module shifts a connecting state of the connect-disconnect mechanism to a first state when the engine is in the all-cylinder operation, and shifts the connecting state to a second state in which the connection is tighter than the first state when the engine is in the reduced-cylinder operation. In response to issued requests to shift the engine operating state, the connection controlling module shifts the connecting state, and the engine controlling module shifts the engine operating state.

20 Claims, 5 Drawing Sheets

(51) Int. Cl.
  *B60W 10/02* (2006.01)
  *B60W 10/06* (2006.01)
  *F16D 3/12* (2006.01)
  *F16D 48/06* (2006.01)
  *F02D 41/02* (2006.01)
  *F02D 41/00* (2006.01)
  *F02D 41/10* (2006.01)

(52) U.S. Cl.
  CPC ......... *B60W 30/20* (2013.01); *F02D 41/0087* (2013.01); *F02D 41/022* (2013.01); *F02D 41/10* (2013.01); *F16D 3/12* (2013.01); *F16D 48/06* (2013.01); *B60W 2030/203* (2013.01); *B60W 2710/021* (2013.01); *B60W 2710/06* (2013.01); *F02D 2250/21* (2013.01); *F02D 2250/28* (2013.01); *F16D 2300/22* (2013.01); *F16D 2500/1045* (2013.01); *F16D 2500/10412* (2013.01); *F16D 2500/306* (2013.01); *F16D 2500/30401* (2013.01)

(58) Field of Classification Search
  CPC ....... B60W 2030/203; B60W 2710/021; F16D 3/12; F16D 43/06; F16D 2500/30401; F16D 2500/10412; F16D 2500/1045; F16D 2500/306; F16D 2300/22; F02D 41/10; F02D 41/022; F02D 41/0087; F02D 2250/21; F02D 2250/28
  See application file for complete search history.

(56) References Cited

U.S. PATENT DOCUMENTS

| | | | |
|---|---|---|---|
| 2015/0005078 A1* | 1/2015 | Sekiguchi | F16H 45/02 464/24 |
| 2015/0323041 A1* | 11/2015 | Takikawa | F16F 15/145 192/3.29 |
| 2015/0377320 A1* | 12/2015 | Miyahara | F16F 15/145 188/378 |
| 2017/0122426 A1* | 5/2017 | Miller | F02C 7/36 |
| 2017/0159747 A1* | 6/2017 | Nakashima | F16D 48/06 |

* cited by examiner

CONTROL APPARATUS OF POWERTRAIN WITH CENTRIFUGAL PENDULUM ABSORBER

BACKGROUND

The present invention relates to a control apparatus of a powertrain of a vehicle etc., particularly to a control apparatus of a powertrain having a centrifugal pendulum absorber.

Conventionally, to improve fuel efficiency of engines of vehicles mounted with a powertrain forming a drive force transmission path which is from the engine to drive wheels via an automatic transmission, it is known to apply a reduced-cylinder operation, a homogeneous charge compression ignition (HCCI) combustion of the engine, and further omission of a torque converter from the automatic transmission, etc.

However, with such an engine adopting the reduced-cylinder operation and/or the HCCI combustion, the output torque thereof tends to vary greatly. With the omission of the torque converter from the automatic transmission, the torque variation of the engine is outputted as-is without attenuating. Thus, in the vehicles applied with theses arts, the variation in torque transmitted to a drive force transmission system on an output side of the automatic transmission becomes large. Especially if torsional vibration caused by the torque variation is amplified by resonance of the drive force transmission system, vibration and noise may occur in various parts of the vehicle.

For this, an art of communicating a centrifugal pendulum absorber with a drive force transmission shaft so as to reduce vibration is known (e.g., JP2014-228009A). The centrifugal pendulum absorber includes a support member for rotating together with the drive force transmission shaft, and a pendulum (mass body) supported by the support member to be swingable with respect to a point on a circumference of a circle with a given radius centering on an axial center of the support member.

Here, within a low engine speed range applied when the engine starts etc., the centrifugal pendulum absorber communicated with the drive force transmission shaft rotates at a low speed, and a centrifugal force which acts on the pendulum becomes small. Therefore, the operation of the pendulum to reduce the torque variation by using the centrifugal force becomes unstable, and an abnormal sound may occur by being brought into contact with a peripheral member. In order to reduce the abnormal sound, in the invention of JP2014-228009A, a connect-disconnect mechanism for cutting off drive force transmission to the centrifugal pendulum absorber within the low engine speed range is disposed between the drive force transmission shaft and the centrifugal pendulum absorber. The connect-disconnect mechanism in this specification is a frictional engagement type clutch which transmits a drive force with a friction force, and even if there is a difference in rotational speed between an input shaft and an output shaft thereof, the clutch is capable of smoothly transmitting a torque by shifting itself from a released state to one of a slip state and an engaged state while adjusting a tightness of the engagement by a hydraulic or current control. Note that the words "engagement" and "release" in this specification mean general connection and disconnection of the connect-disconnect mechanism, and the word "slip" means an incomplete connection where the connect-disconnect mechanism slips.

Here, with the connect-disconnect mechanism between the drive force transmission shaft and the centrifugal pendulum absorber similarly to the conventional art of JP2014-228009A, since the torque variation is large during the reduced-cylinder operation as described above, it is considered to let the centrifugal pendulum absorber exert the vibration reducing function when the engine shifts from an all-cylinder operation to the reduced-cylinder operation, by outputting an engaging command to shift the connect-disconnect mechanism from the released state to the engaged state simultaneously with an output of a cylinder reduction (suspension) command.

However, if the connect-disconnect mechanism is especially a hydraulic type, the engagement or release of the connect-disconnect mechanism is generally delayed with respect to the shifting of the operating state of the engine. Therefore, when the engine shifts from the all-cylinder operation to the reduced-cylinder operation in which the vibration reduction by the centrifugal pendulum absorber is requested, the engagement of the connect-disconnect mechanism does not complete even after the engine shifted to the reduced-cylinder operation, and during this time, the torque variation of the engine cannot be reduced by the centrifugal pendulum absorber, and the vibration problem described above may arise.

Further, when the engine shifts from the reduced-cylinder operation to the all-cylinder operation, if the release of the connect-disconnect mechanism delays, especially when an acceleration request is issued by depression of an acceleration pedal, acceleration of the vehicle may be interrupted by an inertia moment (inertia) of the centrifugal pendulum absorber which acts on the drive force transmission shaft as a load moment.

SUMMARY

The present invention is made in view of the above issues, and aims to provide a control apparatus of a powertrain with a centrifugal pendulum absorber, which is capable of satisfying, when shifting an operating state of an engine, both an acceleration request of a vehicle by a vehicle driver and a vibration reducing request toward the centrifugal pendulum absorber.

According to one aspect of the present invention, a control apparatus of a powertrain with a centrifugal pendulum absorber is provided. The apparatus includes an engine formed with a plurality of cylinders, a drive force transmission shaft for receiving an output torque of the engine, a centrifugal pendulum absorber for reducing a variation in the output torque, a connect-disconnect mechanism disposed between the drive force transmission shaft and the centrifugal pendulum absorber, and a processor configured to execute an engine controlling module for shifting an operating state of the engine between an all-cylinder operation and a reduced-cylinder operation, and a connection controlling module for controlling a connecting state of the connect-disconnect mechanism. The connection controlling module shifts the connecting state to a first state when the engine is in the all-cylinder operation, and shifts the connecting state to a second state in which the connection is tighter than the first state when the engine is in the reduced-cylinder operation. When a request to shift the operating state of the engine from the reduced-cylinder operation to the all-cylinder operation is issued, the connection controlling module shifts the connecting state from the second state to the first state, and the engine controlling module shifts the operating state of the engine from the reduced-cylinder operation to the all-cylinder operation. When a request to shift the operating state of the engine from the all-cylinder operation to the reduced-cylinder operation is issued, the connection controlling module shifts the connecting state from the first state to the second state, and the engine controlling module shifts the operating state of the engine from the all-cylinder operation to the reduced-cylinder operation at a timing that is later by a given period than the shift timing of the case where the request to shift the operating state from the reduced-cylinder operation to the all-cylinder operation is issued.

According to the above configuration, when the shifting of the engine from the reduced-cylinder operation to the all-cylinder operation is requested, the connection controlling module shifts the connect-disconnect mechanism from the second state to the first state, and the engine controlling module shifts the engine from the reduced-cylinder operation to the all-cylinder operation. When the shifting of the engine from the all-cylinder operation to the reduced-cylinder operation is requested, the connection controlling module shifts the connect-disconnect mechanism from the released or slip state to the engaged state, and the engine controlling module shifts the engine from the all-cylinder operation to the reduced-cylinder operation at a timing that is later by a given period than the shift timing of the case where the shifting from the reduced-cylinder operation to the all-cylinder operation is issued. Therefore, when the shifting to the all-cylinder operation is requested, the shifting is performed comparatively early after the shifting from the second state to the first state, by which the engagement of the connect-disconnect mechanism becomes less tight. Thus, also when the shifting to the all-cylinder operation is requested due to an acceleration request, an inertia moment of the centrifugal pendulum absorber interrupting acceleration of a vehicle on which the apparatus is mounted is prevented. Moreover, when the shifting to the reduced-cylinder operation is requested, the shifting is performed comparatively late after the shifting from the first state to the second state, by which the engagement of the connect-disconnect mechanism becomes tighter. Thus, the engine is prevented from shifting to the reduced-cylinder operation while the tightness of engagement of the connect-disconnect mechanism remains low, and a possibility where the centrifugal pendulum absorber cannot reduce the torque variation of the engine is reduced. As a result, both the acceleration request of the vehicle by a driver and a vibration reducing request toward the centrifugal pendulum absorber are achieved.

According to another aspect of the present invention, a control apparatus of a powertrain with a centrifugal pendulum absorber is provided. The apparatus includes an engine formed with a plurality of cylinders, a drive force transmission shaft for receiving an output torque of the engine, a centrifugal pendulum absorber for reducing a variation in the output torque, a connect-disconnect mechanism disposed between the drive force transmission shaft and the centrifugal pendulum absorber, and a processor configured to execute an engine controlling module for shifting an operating state of the engine between an all-cylinder operation and a reduced-cylinder operation, and a connection controlling module for controlling a connecting state of the connect-disconnect mechanism. The connection controlling module shifts the connecting state to a first state when the engine is in the all-cylinder operation, and shifts the connecting state to a second state in which the connection is tighter than the first state when the engine is in the reduced-cylinder operation. When a request to shift the operating state of the engine from the reduced-cylinder operation to the all-cylinder operation is issued, the connection controlling module shifts the connecting state from the second state to the first state, and the engine controlling module shifts the operating state of the engine from the reduced-cylinder operation to the all-cylinder operation. When a request to shift the operating state of the engine from the all-cylinder operation to the reduced-cylinder operation is issued, the connection controlling module shifts the connecting state from the first state to the second state, and the engine controlling module shifts the operating state of the engine from the all-cylinder operation to the reduced-cylinder operation at a timing that is after a given period from the shifting of the connecting state from the first state to the second state.

Further according to the above configuration, when the shifting of the engine from the reduced-cylinder operation to the all-cylinder operation is requested, the connection controlling module shifts the connect-disconnect mechanism from the second state to the first state, and the engine controlling module shifts the engine from the reduced-cylinder operation to the all-cylinder operation. When the shifting of the engine from the all-cylinder operation to the reduced-cylinder operation is requested, the connection controlling module shifts the connect-disconnect mechanism from the first state to the second state, and the engine controlling module shifts the engine from the all-cylinder operation to the reduced-cylinder operation at a timing that is after a given period from the shifting from the first state to the second state. Therefore, when the shifting to the all-cylinder operation is requested, the shifting is performed smoothly after the shifting from the second state to the first state, by which the engagement of the connect-disconnect mechanism becomes less tight. Thus, also when the shifting to the all-cylinder operation is requested due to the acceleration request, the interruption on the acceleration of the vehicle by the inertia moment of the centrifugal pendulum absorber is prevented. Moreover, when the shifting to the reduced-cylinder operation is requested, the shifting is performed after the given period since the shifting from the first state to the second state, by which the engagement of the connect-disconnect mechanism becomes tighter. Thus, the engine is prevented from shifting to the reduced-cylinder operation while the tightness of engagement of the connect-disconnect mechanism remains low, and the centrifugal pendulum absorber more reliably reduces the torque variation of the engine. As a result, both the acceleration request of the vehicle by the driver and the vibration reducing request toward the centrifugal pendulum absorber are achieved.

Note that in the above aspects, "the shifting from the first state to the second state" and "the shifting from the second state to the first state" regarding the connecting state of the connect-disconnect mechanism and "the shifting from the all-cylinder operation to the reduced-cylinder operation" and "the shifting from the reduced cylinder operation to the all-cylinder operation" regarding the operating state of the engine include both an output of a command for the shifting, and actual shifting of the connecting state and the operating state.

The given period may be determined based on a period required for the shifting from the first state to the second state of the connect-disconnect mechanism to complete.

Further according to the above configuration, since the given period is determined based on a period required for the shifting from the first state to the second state of the connect-disconnect mechanism to complete, it is possible for the engine to shift to the reduced-cylinder operation after the connect-disconnect mechanism actually shifts to the second state (e.g., an engaged state). Therefore, the reduced-cylinder operation does not start while the connect-disconnect mechanism remains in the first state (e.g., a released state). As a result, the situation where the centrifugal pendulum absorber cannot reduce the torque variation of the engine is more reliably prevented.

The apparatus described above may further include a connecting state detector for detecting the connecting state of the connect-disconnect mechanism. The given period may correspond to a period until the connecting state detector detects that the shifting of the connect-disconnect mechanism from the first state to the second state is completed.

Further according to the above configuration, since the connecting state detector for detecting the connecting state of the connect-disconnect mechanism is provided, and the given period corresponds to a period until the connecting state detector detects the completion of shifting of the connect-disconnect mechanism from the first state to the second state, the engine is shifted to the reduced-cylinder operation after it is detected that the connect-disconnect mechanism actually shifted to the second state (e.g., the engaged state). Therefore, the reduced-cylinder operation does not start while the connect-disconnect mechanism remains in the first state (e.g., the released state). As a result, the situation where the centrifugal pendulum absorber cannot reduce the torque variation of the engine is reliably prevented.

The engine controlling module may shift the operating state of the engine from the reduced-cylinder operation to the all-cylinder operation in response to the request to shift the operating state of the engine from the reduced-cylinder operation to the all-cylinder operation.

Further according to the above configuration, the engine controlling module shifts the engine from the reduced-cylinder operation to the all-cylinder operation in response to the request to shift the engine from the reduced-cylinder operation to the all-cylinder operation. Therefore, also even when the shifting to the all-cylinder operation is requested due to the acceleration request, the inertia moment of the centrifugal pendulum absorber does not interrupt the acceleration of the vehicle.

The first state of the connect-disconnect mechanism may be a state where the connect-disconnect mechanism is disconnected.

Further according to the above configuration, since the first state is the state where the connect-disconnect mechanism is released, upon the acceleration request, by shifting the connect-disconnect mechanism to the first state, it is possible to more reliably prevent the interruption on the acceleration of the vehicle by the inertia moment of the centrifugal pendulum absorber.

The second state of the connect-disconnect mechanism may be a state where the connect-disconnect mechanism is connected.

Further according to the above configuration, since the second state is the state where the connect-disconnect mechanism is engaged, when shifting the connect-disconnect mechanism to the second state, it is possible to reduce the output torque variation of the engine more reliably by the centrifugal pendulum absorber.

DETAILED DESCRIPTION OF EMBODIMENT

Hereinafter, an embodiment of the present invention is described in detail with reference to the appended drawings.

Figure 1:
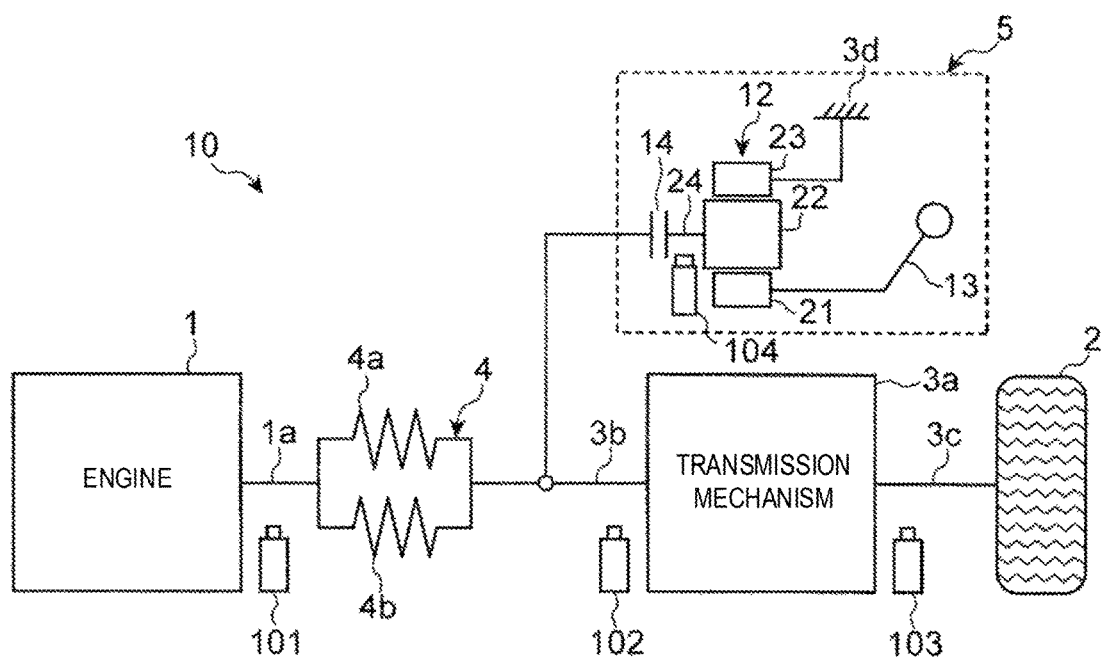
FIG. 1 is a schematic view illustrating a powertrain with a centrifugal pendulum absorber according to one embodiment of the present invention.

FIG. 1 is a schematic view illustrating a powertrain 10 with a centrifugal pendulum absorber according to one embodiment of the present invention. As illustrated in FIG. 1, the powertrain 10 includes an engine 1, a transmission mechanism 3a of an automatic transmission for transmitting a drive force of the engine 1 to drive wheels 2, a torsional vibration absorber mechanism 4 connecting an output shaft 1a of the engine 1 with an input shaft 3b of the transmission mechanism 3a, and a centrifugal pendulum absorber mechanism 5 communicated with the input shaft 3b of the transmission mechanism 3a.

The engine 1 is a multi-cylinder engine capable of switching its operation state between an all-cylinder operation and a reduced-cylinder operation in which operation of one or some (not all) of the cylinders are suspended.

The automatic transmission is a multistage transmission including the transmission mechanism 3a for switching a gear ratio in a stepwise fashion by selectively engaging a plurality of frictional engaging elements. Note that the automatic transmission may be a continuously variable automatic transmission (CVT) including a transmission mechanism for continuously changing the gear ratio. Moreover, a torque converter may be provided instead of the torsional vibration absorber mechanism 4.

The torsional vibration absorber mechanism 4 is provided with a first spring member 4a and a second spring member 4b disposed in parallel to each other, and these members are disposed between the output shaft 1a and the input shaft 3b to be in line therewith. Thus, the rotation of the output shaft 1a is transmitted to the input shaft 3b through the spring members 4a and 4b. Note that "the input shaft 3b" of this embodiment may be referred to as "the drive force transmission shaft."

The centrifugal pendulum absorber mechanism 5 includes a planetary gear set 12 which is an acceleration mechanism for speeding up the rotation of the input shaft 3b, a centrifugal pendulum absorber 13 communicated with the input shaft 3b via the planetary gear set 12, and a clutch mechanism 14 which is a connect-disconnect mechanism capable of disconnecting the drive force transmission from the input shaft 3b to the planetary gear set 12. Note that the clutch mechanism 14 may be disposed between the planetary gear set 12 and the centrifugal pendulum absorber 13.

The planetary gear set 12 is a single pinion type. As these rotational elements, the planetary gear set 12 has a sun gear 21, a ring gear 23, and a pinion carrier 24 (hereinafter, simply referred to as "the carrier 24") supporting a pinion 22 meshed with the sun gear 21 and the ring gear 23.

In the planetary gear set 12, the carrier 24 is communicated with the input shaft 3b via the clutch mechanism 14, and the sun gear 21 is communicated with the centrifugal pendulum absorber 13. Further the rotation of the ring gear 23 is inhibited by being coupled to a transmission case 3d.

The centrifugal pendulum absorber 13 includes a support member coupled to the sun gear 21 of the planetary gear set 12, and a pendulum (mass body) supported by the support member to be swingable with respect to a point on a circumference of a circle having a given radius centering on an axial center of the support member. In the centrifugal pendulum absorber 13, the pendulum is swung due to a torque variation, thus a component of force acting in the circumferential direction is produced in the supporting member while receiving a centrifugal force on the pendulum, and the component of force acts as a counter torque which reduces the torque variation of the support member. As a result, torsional vibration of the input shaft 3b is absorbed.

The clutch mechanism 14 includes a plurality of friction plates for engaging with each other, a hydraulic actuator for engaging the friction plates by pressing them. By controlling hydraulic pressure applied to the actuator, the tightness of engagement changes, i.e., the clutch mechanism 14 shifts to one of engaged, released and slip states.

Next, the operation of the powertrain 10 is described.

First if the engine 1 is operated, the drive force generated thereby is transmitted to the torsional vibration absorber mechanism 4. At this point, the torque variation of the engine 1 is absorbed by the torsional vibration absorber mechanism 4 to some extent. Part of the transmitted drive force is further transmitted from the input shaft 3b of the transmission mechanism 3a to the centrifugal pendulum absorber mechanism 5. When the clutch mechanism 14 of the centrifugal pendulum absorber mechanism 5 is engaged, the drive force is transmitted from the input shaft 3b to the planetary gear set 12 via the clutch mechanism 14. Here, since the rotation of the ring gear 23 of the planetary gear set 12 is inhibited by the transmission case 3d, the sun gear 21 is rotated in accordance with the rotation of the carrier 24 coupled to the input shaft 3b. The rotation of the sun gear 21 is sped up with respect to the rotation of the carrier 24 according to a ratio of the number of teeth of the sun gear 21 with respect to the number of the teeth of the ring gear 23. The centrifugal pendulum absorber 13 is driven at the increased rotational speed of the sun gear 21. At this point, the torque variation which remains even after absorption at the torsional vibration absorber mechanism 4 is absorbed by the centrifugal pendulum absorber 13.

Further the powertrain 10 of this embodiment is provided with an engine speed sensor 101 for detecting a rotational speed of the output shaft 1a of the engine 1, a transmission mechanism input shaft speed sensor 102 for detecting a rotational speed of the input shaft 3b of the transmission mechanism 3a (hereinafter, simply referred to as "the input shaft speed sensor 102"), a vehicle speed sensor 103 for detecting a rotational speed of an output shaft 3c of the transmission mechanism 3a, and a pendulum speed sensor 104 for detecting a rotational speed of the centrifugal pendulum absorber 13. The speed sensors 101 to 104 may be magnetic sensors of any of pickup coil, hall element, magnetoresistive element types, etc.

Note that the pendulum speed sensor 104 of this embodiment detects the rotational speed of the rotational element on the planetary gear set 12 side of the clutch mechanism 14 coupled to the centrifugal pendulum absorber 13 via the planetary gear set 12, and based on this rotational speed, indirectly detects the rotational speed of the centrifugal pendulum absorber 13 in consideration of the speed increase by the planetary gear set 12. However, the pendulum speed sensor 104 may directly detect the rotational speed of the centrifugal pendulum absorber 13. Further since the engine speed is substantially the same as the transmission mechanism input shaft rotational speed, one of the engine speed sensor 101 and the input shaft speed sensor 102 may be omitted.

The powertrain 10 having the above configuration is further provided with a control unit 100 (not illustrated in FIG. 1) for comprehensively controlling the components relating to the powertrain 10, such as the engine 1, the automatic transmission, and the clutch mechanism 14 of the pendulum absorber mechanism 5. Note that the control unit 100 is mainly comprised of a processor 150 configured to execute various modules stored in non-volatile memory or firmware of the control unit 100 to perform their respective functions.

Next, a control system of the powertrain configured by the control unit 100 is described with reference to FIG. 2.

Figure 2:
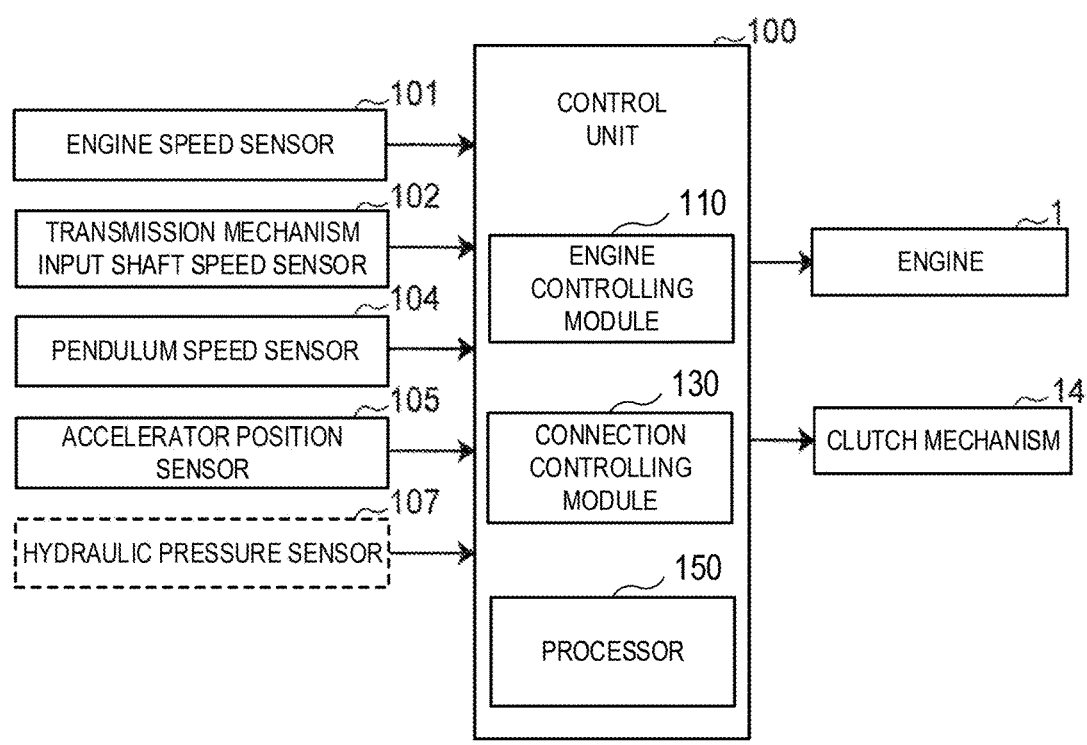
FIG. 2 is a block diagram of a control system of the powertrain.

FIG. 2 is a block diagram of the control system of the powertrain 10. As illustrated in FIG. 2, the control unit 100 receives signals from the engine speed sensor 101, the input shaft speed sensor 102, the pendulum speed sensor 104, an accelerator position sensor 105 for detecting an accelerator opening, etc. Note that a hydraulic pressure sensor 107 for detecting hydraulic control pressure supplied to the clutch mechanism 14 may be provided alternatively/additionally to the pendulum speed sensor 104.

Moreover, the control unit 100 includes an engine controlling module 110 executed by the processor 150 to output a control signal to the engine 1 and a connection controlling module 130 executed by the processor 150 to output a control signal to the clutch mechanism 14 to control the tightness of the engagement thereof based on the disconnecting command.

In this embodiment, the tightness of the engagement of the clutch mechanism 14 is determined based on a rotational difference $\Delta N$ of the clutch mechanism 14 ($=N_a-N_b$) obtained based on a rotational speed $N_a$ of the input shaft 3b detected by the input shaft speed sensor 102 and a rotational speed $N_b$ of the centrifugal pendulum absorber 13 detected by the pendulum speed sensor 104 (before being sped up). Here, when an inertia moment of the centrifugal pendulum absorber 13 alone is $J_0$, the inertia moment of the centrifugal pendulum absorber 13 added to the input shaft 3a according to the tightness of the engagement is calculated by the following Equation 1.

$$J_0 \times \left(1 - \frac{\Delta N}{N_a}\right)^2 \qquad (1)$$

As is apparent from Equation 1, in a completely engaged state of the clutch mechanism 14, the rotational difference $\Delta N$ becomes zero and the inertia moment added to the input shaft 3b becomes a highest value ($J_0$). In the slip state of the clutch mechanism 14, the rotational difference $\Delta N$ becomes a given value which is above zero but below $N_1$, the inertia moment added to the input shaft 3b becomes a given value below $J_0$. Further, in a state where the clutch mechanism 14 is completely released and the rotation of the centrifugal pendulum absorber 13 is stopped ($N_b=0$), the rotational difference $\Delta N$ becomes $N_a$ and the inertia moment added to the input shaft 3b becomes a minimum value (zero).

Note that the tightness of the engagement of the clutch mechanism 14 may be determined based on the hydraulic control pressure of the clutch mechanism 14 detected by the hydraulic pressure sensor 107.

Figure 3:
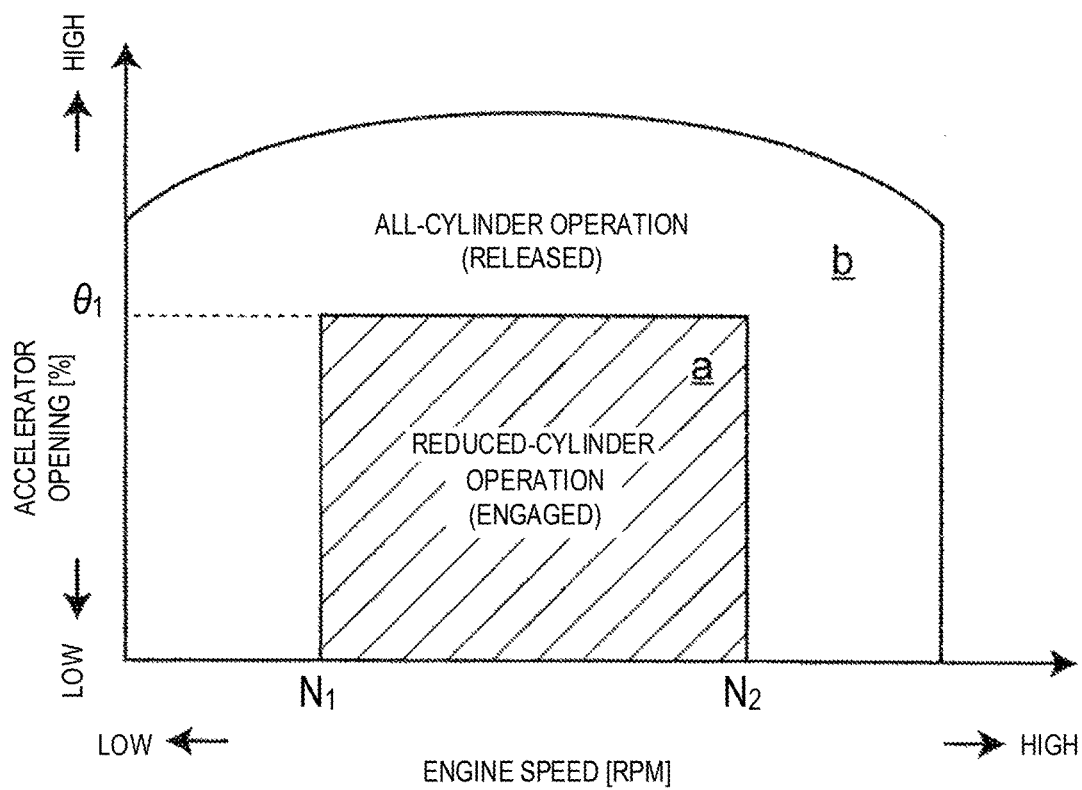
FIG. 3 is a control map for shifting an operating state of the engine of the powertrain and disconnecting a clutch mechanism.

FIG. 3 is a control map of the engine 1 and the clutch mechanism 14. The control map is stored in, for example, a ROM provided to the control unit 100 and, as illustrated in FIG. 3, defines a relationship between an operating state of the engine 1 with respect to the accelerator opening and the engine speed (all-cylinder or reduced-cylinder operation), and the connecting state (engaged or released) of the clutch mechanism 14. The engine controlling module 110 and the connection controlling module 130 control the engine 1 and the clutch mechanism 14, respectively, by referring to the control map based on the output signals from the engine speed sensor 101 and the accelerator position sensor 105.

That is, the engine controlling module 110 performs the reduced-cylinder operation in which open-close operations of intake and exhaust valves of a given cylinder of the engine 1 are suspended within a reduced-cylinder operating range (range "a" in FIG. 3) where the accelerator opening is below $\theta_1$ and the engine speed is above $N_1$ but below $N_2 (N_2 > N_1)$. Further, the engine controlling module 110 performs the all-cylinder operation in which all the cylinders of the engine 1 are operated within an all-cylinder operating range (range "b" in FIG. 3) including a high engine load operating segment where the accelerator opening is between $\theta_1$ and fully opened, a low engine speed operating segment where the engine speed is $N_1$ or below, and a high engine speed operating segment where the engine speed is $N_2$ or above.

Moreover, the connection controlling module 130 controls the tightness of the engagement of the clutch mechanism 14 so that it becomes the engaged state within the reduced-cylinder operating range, and becomes the released state within the all-cylinder operating range.

Here, if the shifting of the engine 1 from the reduced-cylinder operation to the all-cylinder operation is requested, i.e., within a low engine load operating segment where the accelerator opening is below $\theta_1$ and when the engine speed reaches the speed $N_1$ while dropping from the reduced-cylinder operating range to the low engine speed operating segment of the all-cylinder operating range, or when the engine speed reaches the speed $N_2$ while increasing from the reduced-cylinder operating range to the high engine speed operating segment, the connection controlling module 130 changes the tightness of the engagement to shift the clutch mechanism 14 from the engaged state to the released state, and the engine controlling module 110 shifts the engine 1 from the reduced-cylinder operation to the all-cylinder operation.

If the shifting of the engine 1 from the all-cylinder operation to the reduced-cylinder operation is requested, i.e., within the low engine load operating segment and when the engine speed reaches the speed $N_1$ while increasing from the low engine speed operating segment of the all-cylinder operating range to the reduced-cylinder operating range, or when the engine speed reaches the speed $N_2$ while dropping from the high engine speed operating segment of the all-cylinder operating range to the reduced-cylinder operating range, the connection controlling module 130 shifts the clutch mechanism 14 from the released state to the engaged state, and once this shifting to the engaged state is completed, the engine controlling module 110 shifts the engine 1 from the all-cylinder operation to the reduced-cylinder operation.

As described above, whether the shifting of the clutch mechanism 14 to the engaged state is completed may be determined by detecting the rotational difference of the clutch mechanism 14 based on the output signals from the input shaft speed sensor 102 and the pendulum speed sensor 104 and then based on whether the detected rotational difference is zero.

(Control Method of Powertrain)

Figure 4:
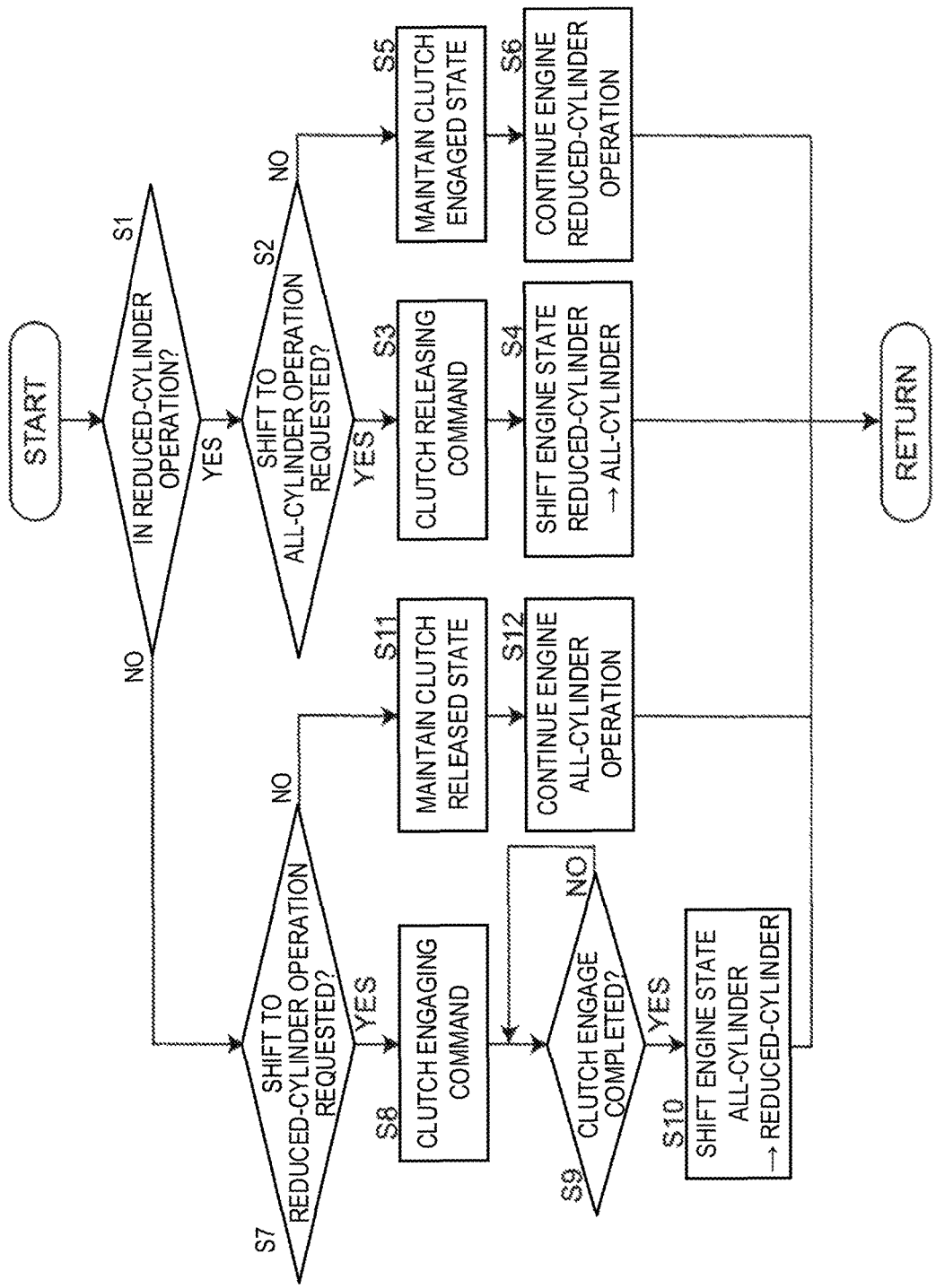
FIG. 4 is a flowchart illustrating a control method of the powertrain.

The powertrain 10 described above is controlled by the control unit 100 based on the flowchart of FIG. 4, for example.

As illustrated in FIG. 4, first at S1, whether or not the engine 1 is currently in the reduced-cylinder operation is determined.

If the engine 1 is determined to be in the reduced-cylinder operation as a result of S1, at S2, whether or not a request to shift the engine 1 to the all-cylinder operation is issued is determined based on the engine speed sensor 101 and the accelerator position sensor 105.

If the request to shift the engine 1 to the all-cylinder operation is determined as issued as a result of S2, at S3, a command to shift the clutch mechanism 14 from the engaged state to the released state is outputted, and then at S4, the operating state of the engine 1 is shifted from the reduced-cylinder operation to the all-cylinder operation.

If the request to shift the engine 1 to the all-cylinder operation is determined as not issued as the result of S2, at S5, the clutch mechanism 14 is maintained in the engaged state, and then at S6, the reduced-cylinder operation of the engine 1 is continued.

On the other hand, if the engine 1 is determined to be not in the reduced-cylinder operation (i.e., the engine 1 is in the all-cylinder operation) as the result of S1, at S7 whether the request to shift the engine 1 to the reduced-cylinder operation is issued is determined based on the engine speed sensor 101 and the accelerator position sensor 105.

If the request to shift the engine 1 to the reduced-cylinder operation is determined as issued as a result of S7, at S8, a command to shift from the released state to the engaged state is outputted to the clutch mechanism 14. Then at S9, whether or not the engagement of the clutch mechanism 14 is completed is determined. If the engagement of the clutch mechanism 14 is determined as completed as a result of S9, at S10, the engine 1 is shifted from the all-cylinder operation to the reduced-cylinder operation.

If the request to shift the engine 1 to the reduced-cylinder operation is determined as not issued as the result of S7, at S11, the released state of the clutch mechanism 14 is maintained, and then at S12, the all-cylinder operation of the engine 1 is continued.

After completion of one of S4, S6, S10 and S12, the flow returns to S1.

Note that at S9 described above, an elapse of time from the output of the engaging command of the clutch mechanism 14 at S8 may be measured by using a timer etc. and whether a given time passed may thus be determined. Here the given time is set based on a required time from the engagement completion of the clutch mechanism 14 from the output of the engaging command.

(Modification)

Next, a modification of specific operation of the control unit 100 is described with reference to the control map of FIG. 5.

Figure 5:
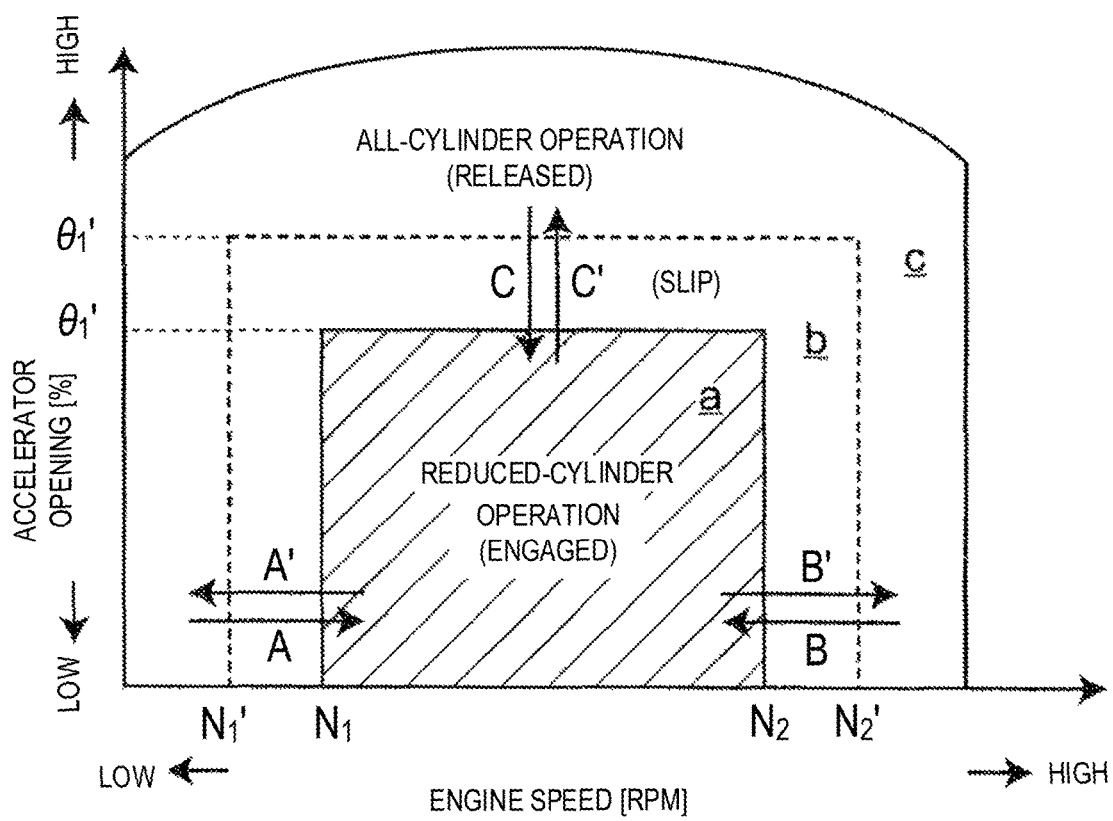
FIG. 5 is a modification of the control map of FIG. 3.

FIG. 5 is a control map similar to FIG. 3, defining a relationship between the operating state of the engine 1 (all-cylinder or reduced-cylinder operation), and the connecting state of the clutch mechanism 14 with respect to the accelerator opening and the engine speed; however it is different from FIG. 3 in that, within a segment of the all-cylinder operating range adjacent to the reduced-cylinder operating range, the tightness of the engagement of the clutch mechanism 14 is controlled so as to be the slip state.

That is, similar to FIG. 3, the engine controlling module 110 performs the reduced-cylinder operation within the reduced-cylinder operating range (range "a" in FIG. 5) where the accelerator opening is below $\theta_1$ and the engine speed is above $N_1$ but below $N_2$ ($N_2>N_1$). Further, the engine controlling module 110 performs the all-cylinder operation within the all-cylinder operating range (ranges "b" and "c" in FIG. 5) including the high engine load operating segment where the accelerator opening is between $\theta_1$ and fully opened, the low engine speed operating segment where the engine speed is $N_1$ or below, and the high engine speed operating segment where the engine speed is $N_2$ or above.

Moreover, the connection controlling module 130 controls the tightness of the engagement of the clutch mechanism 14 to be the engaged state within the reduced-cylinder operating range "a." Further, the connection controlling module 130 controls the tightness of the engagement of the clutch mechanism 14 to be the slip or released state within a segment of the all-cylinder operating range adjacent to the reduced-cylinder operating range "a," i.e., an inner region segment of the all-cylinder operating range (range "b" in FIG. 5) formed by excluding the reduced-cylinder operating range "a" from a segment where the accelerator opening is below $\theta_1'$ ($\theta_1'>\theta_1$) and the engine speed is above $N_1'$ ($N_1'<N_1$) but below $N_2'$ ($N_2'>N_2$). Within an outer region segment of the all-cylinder operating range (range "c" in FIG. 5) formed by excluding the inner region segment from the all-cylinder operating range, the connection controlling module 130 controls the tightness of the engagement of the clutch mechanism 14 to be the released state.

Here, if the shifting of the engine 1 from the reduced-cylinder operation to the all-cylinder operation is requested due to a change in the engine speed within the low engine load operating segment, for example, while the accelerator opening remains below $\theta_1'$, when the engine speed reaches $N_1$ during the drop from $N_1$ to below $N_1'$ (arrow A' in FIG. 5) or it reaches $N_2$ during the increase from below $N_2$ to above $N_2'$ (arrow B' in FIG. 5), the connection controlling module 130 starts to gradually lower the tightness of engagement so as to smoothly shift the clutch mechanism 14 from the engaged state to the released state through the slip state, and the engine controlling module 110 shifts the engine 1 from the reduced-cylinder operation to the all-cylinder operation.

Further, if the shifting of the engine 1 from the reduced-cylinder operation to the all-cylinder operation is requested due to the change of the acceleration opening, for example, when the accelerator opening reaches $\theta_1$ during the increase from below $\theta_1$ to $\theta_1'$ or above (arrow C' in FIG. 5), the following controls are performed in view of prompt acceleration of the vehicle. That is, the connection controlling module 130 sharply reduces the tightness of engagement to prohibit/avoid the clutch mechanism 14 from shifting to the slip state so that it directly shifts from the engaged state to the released state, and the engine controlling module 110 shifts the engine 1 from the reduced-cylinder operation to the all-cylinder operation.

Moreover, if the shifting of the engine 1 from the all-cylinder operation to the reduced-cylinder operation is requested due to the change of the engine speed and the decrease of the accelerator opening (engine load reduction) within the low engine load operating segment, for example, when the engine speed reaches $N_1'$ during the increase from below $N_1'$ to above $N_1$ (arrow A in FIG. 5) or reaches $N_2'$ during the drop from $N_2'$ or above to below $N_2$ (arrow B in FIG. 5) while the accelerator opening remains below $\theta_1'$, or when the accelerator opening reaches $\theta_1'$ during the drop from $\theta_1'$ or above to below $\theta_1$ (arrow C in FIG. 5), the following controls are performed. That is, the connection controlling module 130 starts to gradually increase the tightness of engagement so as to smoothly shift the clutch mechanism 14 from the released state to the engaged state through the slip state, and once this shifting is completed, the engine controlling module 110 shifts the engine 1 from the all-cylinder operation to the reduced-cylinder operation.

According to the control map of the modification described above, the clutch mechanism 14 shifts through the slip state while shifting the operating state of the engine 1 due to the engine speed change. Therefore, it is possible to reduce a forward/rearward shock which occurs on the vehicle at the moment that the inertia moment of the centrifugal pendulum absorber 13 changes, which causes discomfort on a vehicle driver.

Further, since the clutch mechanism 14 directly shifts from the engaged state to the released state in the shifting of the engine 1 from the reduced-cylinder operation to the all-cylinder operation due to the change of the accelerator opening, it is possible to more reliably prevent the interruption on the acceleration of the vehicle by the inertia moment of the centrifugal pendulum absorber 13.

Note that the rearward shock which occurs in the shifting of the engine 1 from the reduced-cylinder operation to the all-cylinder operation due to the change of the engine speed within the low engine load operating segment causes less discomfort on the driver than the forward shock which occurs in the shifting of the engine 1 from the all-cylinder operation to the reduced-cylinder operation. Therefore, if the shifting of the engine 1 from the reduced-cylinder operation to the all-cylinder operation is requested due to the change of the engine speeds within the low engine load operating segment, the connection controlling module 130 may prohibit/avoid the clutch mechanism 14 from shifting to the slip state.

Moreover, in the modification of the embodiment described above, although the engine 1 controls the clutch mechanism 14 to the slip state when the engine 1 is in the all-cylinder operation; however, the clutch mechanism 14 may be controlled to the slip state in the reduced-cylinder operation additionally/alternatively to the all-cylinder operation as needed.

With the above configurations, the following operations and effects are obtained according to this embodiment.

According to this embodiment, when the shifting of the engine 1 from the reduced-cylinder operation to the all-cylinder operation is requested, the connection controlling module 130 shifts the clutch mechanism 14 from the engaged state to the released or slip state, and the engine controlling module 110 shifts the engine 1 from the reduced-cylinder operation to the all-cylinder operation. When the shifting of the engine 1 from the all-cylinder operation to the reduced-cylinder operation is requested, the connection controlling module 130 shifts the clutch mechanism 14 from the released or slip state to the engaged state, and the engine controlling module 110 shifts the engine 1 from the all-cylinder operation to the reduced-cylinder operation at a timing that is later by a given period than the shift timing of the case where the shifting from the reduced-cylinder operation to the all-cylinder operation is issued. Therefore, when the shifting to the all-cylinder operation is requested, the shifting is performed comparatively early after the shifting from the engaged state to the released or slip state, by which the engagement of the clutch mechanism 14 becomes less tight. Thus, also when the shifting to the all-cylinder operation is requested due to the acceleration request, the interruption on the acceleration of the vehicle by the inertia moment of the centrifugal pendulum absorber 13 is prevented. Moreover, when the shifting to the reduced-cylinder operation is requested, the shifting is performed comparatively late after the shifting from the released or slip state to the engaged state, by which the engagement of the clutch mechanism 14 becomes tighter. Thus, it is prevented that the engine 1 is shifted to the reduced-cylinder operation while the tightness of engagement of the clutch mechanism 14 remains low, and a possibility that where the centrifugal pendulum absorber 13 cannot reduce the torque variation of the engine 1 is reduced. As a result, both the acceleration request of the vehicle by the driver and the vibration reducing request toward the centrifugal pendulum absorber 13 are achieved.

Further according to this embodiment, when the shifting of the engine 1 from the reduced-cylinder operation to the all-cylinder operation is requested, the connection controlling module 130 shifts the clutch mechanism 14 from the engaged state to the released or slip state, and the engine controlling module 110 shifts the engine 1 from the reduced-cylinder operation to the all-cylinder operation. When the shifting of the engine 1 from the all-cylinder operation to the reduced-cylinder operation is requested, the connection controlling module 130 shifts the clutch mechanism 14 from the released or slip state to the engaged state, and the engine controlling module 110 shifts the engine 1 from the all-cylinder operation to the reduced-cylinder operation at a timing that is after a given period from the shifting of the connecting state from the released or slip state to the engaged state. Therefore, when the shifting to the all-cylinder operation is requested, the shifting is performed smoothly after the shifting from the engaged state to the released or slip state, by which the engagement of the clutch mechanism 14 becomes less tight. Thus, also when the shifting to the all-cylinder operation is requested due to the acceleration request, the interruption on the acceleration of the vehicle by the inertia moment of the centrifugal pendulum absorber 13 is prevented. Moreover, when the shifting to the reduced-cylinder operation is requested, the shifting is performed after the given period since the shifting from the released or slip state to the engaged state, by which the engagement of the clutch mechanism 14 becomes tighter. Thus, it is prevented that the engine 1 is shifted to the reduced-cylinder operation while the tightness of engagement of the clutch mechanism 14 remains low, and the centrifugal pendulum absorber 13 more reliably reduces the torque variation of the engine 1. As a result, both the acceleration request of the vehicle by the driver and the vibration reducing request toward the centrifugal pendulum absorber 13 are achieved.

Further according to this embodiment, since the given period is determined based on a period required for the shifting from the released or slip state to the engaged state of the clutch mechanism 14 to complete, it is possible for the engine 1 to shift to the reduced-cylinder operation after the clutch mechanism 14 actually shifts the engaged state. Therefore, the reduced-cylinder operation does not start while the clutch mechanism 14 remaining in the released or slip state. As a result, the situation where the centrifugal pendulum absorber 13 cannot reduce the torque variation of the engine 1 is more reliably prevented.

Further according to this embodiment, since the speed sensors 102 and 104 for detecting the connecting state of the clutch mechanism 14 are provided, and the given period corresponds to a period until the speed sensors 102 and 104 detect the completion of shifting of the clutch mechanism 14 from the released or slip state to the engaged state, the engine 1 is shifted to the reduced-cylinder operation after it is detected that the clutch mechanism 14 actually shifted to the engaged state. Therefore, the reduced-cylinder operation does not start while the clutch mechanism 14 remaining in the released or slip state. As a result, the situation where the centrifugal pendulum absorber 13 cannot reduce the torque variation of the engine 1 is more reliably prevented.

Further according to this embodiment, the engine controlling module 110 shifts the engine 1 from the reduced-cylinder operation to the all-cylinder operation in response to the request to shift the engine 1 from the reduced-cylinder operation to the all-cylinder operation. Therefore, also even when the shifting to the all-cylinder operation is requested due to the acceleration request, the inertia moment of the centrifugal pendulum absorber 13 does not interrupt the acceleration of the vehicle.

Further according to this embodiment, upon the acceleration request, by shifting the clutch mechanism 14 to the released state without shifting through the slip state, it is possible to more reliably prevent the interruption on the acceleration of the vehicle by the inertia moment of the centrifugal pendulum absorber 13.

Further according to this embodiment, when shifting to the reduced-cylinder operation, by shifting the clutch mechanism 14 to the engaged state, it is possible to reduce the output torque variation of the engine 1 more reliably by the centrifugal pendulum absorber 13.

Note that the present invention is not limited to the above illustrative embodiment, and without departing from the scope of the present invention, various enhancements and various changes in design may be made.

For example, in this embodiment, the example of using the clutch mechanism 14 as the connect-disconnect mechanism is described; however, without limiting to this, for example, a brake mechanism may be provided between the ring gear 23 of the planetary gear set 12 and the transmission case 3*d* to be the connect-disconnect mechanism. Moreover, in this embodiment, the example of using the hydraulic connect-disconnect mechanism is described; however, without limiting to this, for example, an electromagnetic connect-disconnect mechanism may be applied as long as engagement or release thereof delays with respect to the shifting of the operating state of the engine.

Moreover in this embodiment, the example of using one of the speed sensors 102 and 104, the hydraulic sensor 107 or the timer is described; however, without limiting to this, suitable two or more of the speed sensors 102 and 104, the hydraulic sensor 107 and the timer may be used in combination.

Moreover in this embodiment, the example of using the engine 1 structured by an internal combustion engine to be the drive source is described; however, without limiting to this, for example, a so-called hybrid engine may be used, which is constructed by providing a generator to a multi-cylinder engine to generate power with this generator, and assists the engine by using the generator as a motor during the acceleration.

As described above, according to the present invention, when the operating state of the engine shifts, it is possible to satisfy both the acceleration request of the vehicle by the driver and the vibration reducing request toward the centrifugal pendulum absorber. Therefore, the present invention can suitably be used in the technical fields of manufacturing this kind of control apparatuses of powertrains with centrifugal pendulum absorber, and vehicles mounted the same.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
3a Transmission Mechanism
3b Input Shaft (Drive Force Transmission Shaft)
10 Powertrain
13 Centrifugal Pendulum Absorber
14 Clutch Mechanism (Connect-disconnect Mechanism)
100 Controller Unit (Control Apparatus)
110 Engine Controlling Module
130 Connection Controlling Module

What is claimed is:

1. A control apparatus of a powertrain with a centrifugal pendulum absorber, comprising:
an engine formed with a plurality of cylinders;
a drive force transmission shaft for receiving an output torque of the engine;
the centrifugal pendulum absorber for reducing a variation in the output torque;
a connect-disconnect mechanism disposed between the drive force transmission shaft and the centrifugal pendulum absorber; and
a processor configured to execute:
an engine controlling module for shifting an operating state of the engine between an all-cylinder operation and a reduced-cylinder operation; and
a connection controlling module for controlling a connecting state of the connect-disconnect mechanism,
wherein the connection controlling module shifts the connecting state to a first state when the engine is in the all-cylinder operation, and shifts the connecting state to a second state in which the connection is tighter than the first state when the engine is in the reduced-cylinder operation,
wherein when a request to shift the operating state of the engine from the reduced-cylinder operation to the all-cylinder operation is issued, the connection controlling module shifts the connecting state from the second state to the first state, and the engine controlling module shifts the operating state of the engine from the reduced-cylinder operation to the all-cylinder operation, and
wherein when a request to shift the operating state of the engine from the all-cylinder operation to the reduced-cylinder operation is issued, the connection controlling module shifts the connecting state from the first state to the second state, and the engine controlling module shifts the operating state of the engine from the all-cylinder operation to the reduced-cylinder operation at a timing that is later by a given period than a shift timing of the case where the request to shift the operating state from the reduced-cylinder operation to the all-cylinder operation is issued.

2. The apparatus of claim 1, wherein the given period is determined based on a period required for the shifting from the first state to the second state of the connect-disconnect mechanism to complete.

3. The apparatus of claim 2, wherein the engine controlling module shifts the operating state of the engine from the reduced-cylinder operation to the all-cylinder operation in response to the request to shift the operating state of the engine from the reduced-cylinder operation to the all-cylinder operation.

4. The apparatus of claim 3, wherein the first state of the connect-disconnect mechanism is a state where the connect-disconnect mechanism is disconnected.

5. The apparatus of claim 4, wherein the second state of the connect-disconnect mechanism is a state where the connect-disconnect mechanism is connected.

6. The apparatus of claim 2, wherein the first state of the connect-disconnect mechanism is a state where the connect-disconnect mechanism is disconnected.

7. The apparatus of claim 6, wherein the second state of the connect-disconnect mechanism is a state where the connect-disconnect mechanism is connected.

8. The apparatus of claim 1, further comprising a connecting state detector for detecting the connecting state of the connect-disconnect mechanism,
wherein the given period corresponds to a period until the connecting state detector detects that the shifting of the connect-disconnect mechanism from the first state to the second state is completed.

9. The apparatus of claim 8, wherein the engine controlling module shifts the operating state of the engine from the reduced-cylinder operation to the all-cylinder operation in response to the request to shift the operating state of the engine from the reduced-cylinder operation to the all-cylinder operation.

10. The apparatus of claim 9, wherein the first state of the connect-disconnect mechanism is a state where the connect-disconnect mechanism is disconnected.

11. The apparatus of claim 10, wherein the second state of the connect-disconnect mechanism is a state where the connect-disconnect mechanism is connected.

12. The apparatus of claim 8, wherein the first state of the connect-disconnect mechanism is a state where the connect-disconnect mechanism is disconnected.

13. The apparatus of claim 12, wherein the second state of the connect-disconnect mechanism is a state where the connect-disconnect mechanism is connected.

14. The apparatus of claim 1, wherein the engine controlling module shifts the operating state of the engine from the reduced-cylinder operation to the all-cylinder operation in response to the request to shift the operating state of the engine from the reduced-cylinder operation to the all-cylinder operation.

15. The apparatus of claim 14, wherein the first state of the connect-disconnect mechanism is a state where the connect-disconnect mechanism is disconnected.

16. The apparatus of claim 15, wherein the second state of the connect-disconnect mechanism is a state where the connect-disconnect mechanism is connected.

17. The apparatus of claim 1, wherein the first state of the connect-disconnect mechanism is a state where the connect-disconnect mechanism is disconnected.

18. The apparatus of claim 17, wherein the second state of the connect-disconnect mechanism is a state where the connect-disconnect mechanism is connected.

19. The apparatus of claim 1, wherein the second state of the connect-disconnect mechanism is a state where the connect-disconnect mechanism is connected.

20. A control apparatus of a powertrain with a centrifugal pendulum absorber, comprising:
an engine formed with a plurality of cylinders;

a drive force transmission shaft for receiving an output torque of the engine;
the centrifugal pendulum absorber for reducing a variation in the output torque;
a connect-disconnect mechanism disposed between the drive force transmission shaft and the centrifugal pendulum absorber; and
a processor configured to execute:
- an engine controlling module executed by the processor to shift an operating state of the engine between an all-cylinder operation and a reduced-cylinder operation; and
- a connection controlling module executed by the processor to shift a connecting state of the connect-disconnect mechanism, wherein the connection controlling module shifts the connecting state to a first state when the engine is in the all-cylinder operation, and shifts the connecting state to a second state in which the connection is tighter than the first state when the engine is in the reduced-cylinder operation, wherein when a request to shift the operating state of the engine from the reduced-cylinder operation to the all-cylinder operation is issued, the connection controlling module shifts the connecting state from the second state to the first state, and the engine controlling module shifts the operating state of the engine from the reduced-cylinder operation to the all-cylinder operation, and wherein when a request to shift the operating state of the engine from the all-cylinder operation to the reduced-cylinder operation is issued, the connection controlling module shifts the connecting state from the first state to the second state, and the engine controlling module shifts the operating state of the engine from the all-cylinder operation to the reduced-cylinder operation at a timing that is after a given period from the shifting of the connecting state from the first state to the second state.

* * * * *